United States Patent

Freund et al.

[15] 3,688,124
[45] Aug. 29, 1972

[54] SPATIALLY PERIODIC NONLINEAR STRUCTURES FOR FREQUENCY CONVERSION OF ELECTROMAGNETIC ENERGY

[72] Inventors: Isaac Freund, Elizabeth; Barry F. Levine, Westfield, both of N.J.

[73] Assignee: Bell Telephone Laboratories, Incorporated, 2, Murray Hill, N.J.

[22] Filed: April 30, 1969

[21] Appl. No.: 820,472

[52] U.S. Cl.............307/88.3, 321/69 R, 330/4.5, 330/4.6, 331/94.5, 331/107 R
[51] Int. Cl...............................................H03f 7/04
[58] Field of Search...........307/88.3; 321/69; 250/84

[56] References Cited

UNITED STATES PATENTS

| | | | |
|---|---|---|---|
| 2,925,497 | 2/1960 | Bessen | 250/51.5 |
| 3,267,385 | 8/1966 | Ashkin | 307/88.3 |
| 3,309,526 | 3/1967 | Giordmaine | 307/88.3 |
| 3,384,433 | 5/1968 | Bloemberger | 307/88.3 |
| 3,407,309 | 10/1968 | Miller | 307/88.3 |

OTHER PUBLICATIONS

Freund, " Physical Review Letters," Nov. 4, 1968, pp. 1404– 1406.

*Primary Examiner*—Roy Lake
*Assistant Examiner*—Darwin R. Hostetter
*Attorney*—R. J. Guenther and Arthur J. Torsiglieri

[57] ABSTRACT

This disclosure describes the use of spatially periodic media which are nonlinear in response to electromagnetic waves. Various devices which perform second harmonic generation, mixing, and parametric processes are disclosed utilizing these media. The media are oriented with respect to the input waves such that the nonlinear analogue of Bragg's law is satisfied. In this manner, the output waves will have predetermined arbitrary angles with respect to the input waves, depending upon the orientation of the media with respect to the input.

5 Claims, 5 Drawing Figures

FIG. 1

INVENTORS I. FREUND
B. F. LEVINE

PATENTED AUG 29 1972 3,688,124

SPATIALLY PERIODIC NONLINEAR STRUCTURES FOR FREQUENCY CONVERSION OF ELECTROMAGNETIC ENERGY

FIELD OF THE INVENTION

This invention relates generally to nonlinear devices, especially those for operation in response to electromagnetic waves.

BACKGROUND OF THE INVENTION

As disclosed in U. S. Pat. No. 3,384,433, issued on May 21, 1968 to N. Bloembergen, a stack of mutually parallel slabs or sheets (or equivalent thereof) of nonlinear optical material can be arranged to generate a second harmonic optical wave beam when a fundamental optical wave beam is incident upon the stack of sheets. In addition, Bloembergen discloses how such a stack of sheets can also be arranged for optical mixing; that is, for generating an output optical wave beam with a frequency equal to the sum (or difference) of the frequencies of two incident optical wave beams upon the sheet.

These two incident optical beams, of frequencies say $f_1$ and $f_2$, produce a "forced" polarization wave in the sheets. Corresponding to any wave beam in the sheet, there is associated a wave propagation vector whose direction is parallel to the propagation direction and whose magnitude is equal to $2\pi/\lambda$, where $\lambda$ is the wavelength therein. Thus, propagation vectors $\vec{k}_1$ and $\vec{k}_2$ are associated with the beams $f_1$ and $f_2$ in the sheets. Now, the propagation vector associated with the "forced" polarization wave produced by the two aforementioned incident beam is the vector sum resultant, $(\vec{k}_1 + \vec{k}_2)$, of the propagation vectors of the two optical beams $f_1$ and $f_2$ in the sheets. In the particular case of second harmonic generation from a single fundamental input beam, then the propagation vector of the "forced" polarization wave is simply $2\vec{k}_1$, i.e., twice the fundamental wave vector in the sheets.

The "forced" polarization wave, for example, having a "sum" frequency $(f_1 + f_2)$ and propagation vector $(\vec{k}_1 + \vec{k}_2)$, gives rise to a "free" electromagnetic wave of frequency $(f_1 + f_2)$ and propagation vector $\vec{k}_3$ in the nonlinear stack of sheets. This "free" electromagnetic wave gives rise to a useful output wave of frequency $(f_1 + f_2)$ propagating in a direction corresponding to $\vec{k}_3$. In general, this propagation vector $\vec{k}_3$ of the "free" wave can and does have a direction which is different from the "forced" wave $(\vec{k}_1 + \vec{k}_2)$ in the sheets. See N. Bloembergen and S. Pershan, *Light Waves at the Boundary of Nonlinear Media*, Physical Review 128, pp. 606–622 (1962). However, the arrangements disclosed by N. Bloembergen in his aforementioned U. S. Pat. No. 3,384,433 are described as generating a "free" wave $\vec{k}_3$ which propagates only parallel to the "forced" wave $(\vec{k}_1 + \vec{k}_2)$ and in the same sense of direction thereof. However, it is desirable in many embodiments of second harmonic generators, especially in connection with lasers, that the second harmonic beam have a substantially different propagation direction, i.e., which is oblique (i.e., not collinear) with respect to the incident fundamental beam or the reverse thereof. Thus, it is desirable that the second harmonic and fundamental beams be angularly separated sufficiently in order to avoid absorption losses of the second harmonic wave in the laser medium.

Moreover, in wave mixers (or parametric devices in general), it is desirable in many embodiments that the propagation direction of the sum frequency be oblique and substantially different from the vector resultants of the original wave propagation vectors, in order to afford greater flexibility of operation. However, it is known in the art that for successful operation of a parametric amplifier in a uniform nonlinear medium, it must be true that:

$$f_p = f_i + f_s; \quad (1)$$

and $$\vec{k}_p = \vec{k}_i + \vec{k}_s; \quad (2)$$

In Eqs. (1) and (2), the subscript $p$ refers to pump, the subscript $i$ refers to idler, and the subscript $s$ refers to signal; and $f$ is the frequency, while $\vec{k}$ is the "propagation constant" (vector) in the medium. For a given $f_p$ and $f_s$, and any desired directions for $\vec{k}_p$ and $\vec{k}_s$, the idler frequency $f_i$ as determined by Eq. (1) does not in general have a propagation vector $\vec{k}_i$ satisfying Eq. (2) for a given nonlinear parametric medium in which the parametric process takes place. Thus, it is desirable to be able to have means for satisfying the parametric relations for a given pump and signal frequency and any desired directions for the pump and signal propagations.

SUMMARY OF THE INVENTION

In one embodiment of this invention, beams $f_1$ and $f_2$ of optical electromagnetic radiation are incident upon a body of spatially periodic optically nonlinear material. The body is oriented such that there is generated an output wave of sum frequency $(f_1 + f_2)$. Moreover, the body is characterized by a nonlinear optical tensor interaction coefficient having a spatial periodicity equal to a distance 2q in a first spatial direction. It is sufficient, however, that the nonlinear tensor coefficient have a significant spatial Fourier component corresponding to the distance 2q in this first direction. For convenience, a vector $\vec{Q}$ is defined which is parallel to this first direction and is equal in magnitude to:

$$Q = 2\pi/2q \quad (3)$$

For an input of radiation comprising two incident beams of frequencies $f_1$ and $f_2$, and having propagation vectors equal to $\vec{k}_1$ and $\vec{k}_2$ in the body of spatially periodic nonlinear material, a wave having a sum or difference frequency $f_3 = (f_1 + f_2)$ will be generated therein. For definiteness only, the discussion will be restricted to the sum frequency, $f_3 = f_1 + f_2$. However, upon multiple reflections in the body, maximum intensity will be produced for that output wave having a propagation vector $\vec{k}_3$ satisfying:

$$\vec{k}_3 = \vec{k}_1 + \vec{k}_2 + \vec{Q}. \quad (4)$$

While $\vec{Q}$ is parallel to the first direction (of spatial periodicity in the body), there remains an ambiguity of two choices for this direction because a spatial periodicity in one direction implies the same spatial periodicity in the opposite direction. In the case of the reflected wave $\vec{k}_3$, the direction of $\vec{Q}$ is chosen such that it makes either an obtuse angle or a 180° angle with the vector sum, $\vec{k}_1 + \vec{k}_2$. With this direction for $\vec{Q}$, Eq. (4) represents the nonlinear analogue of Bragg's law of reflection; otherwise Eq. (4) represents a more general nonlinear analogue of Bragg's law, i.e., including transmission. As will appear more clearly from the detailed description below, in accordance with this invention, the orientation of the output reflected or transmitted wave $\vec{k}_3$ can be controlled by means of varying the orientation of the body, and hence $Q$, with respect to $(\vec{k}_1 + \vec{k}_2)$. Furthermore, the selection of the magnitude $2q$ of the spatial periodicity of the optical nonlinearity also determines the orientation of the output, $\vec{k}_3$, by reason of Eq. (3) and Eq. (4). Moreover, by reversing the direction of Q, Eq. (4) describes the more general nonlinear Bragg conditions for transmission, including the general case where the generated output "free" wave $\vec{k}_3$ does not propagate in the same direction in the body as does the "forced" polarization wave $(\vec{k}_1 + \vec{k}_2)$.

In the special case in which $(\vec{k}_1 + \vec{k}_2)$ in the body is parallel to $\vec{Q}$ and in which the output wave $\vec{k}_3$ is a transmitted wave, i.e., in the same sense of direction and parallel to $(\vec{k}_1 + \vec{k}_2)$ then the phase shift of the "free" wave $\vec{k}_3$ upon traversing each interval $q$ differs from that of the "forced" wave $(\vec{k}_1 + \vec{k}_2)$ by an odd integral number of half-cycles, in accordance with N. Bloembergen's prescription in his aforementioned U. S. Pat. No. 3,384,433. Otherwise, in the more general cases in which $(\vec{k}_1 + \vec{k}_2)$ oblique with respect to $\vec{Q}$, or in which $\vec{k}_3$ is in the diametrically opposite sense of direction from $(\vec{k}_1 + \vec{k}_2)$ (that is, in a case of reflection), then the aforementioned prescription of N. Bloembergen does not satisfy Eq. (4) and therefore does not yield as efficient a device. In this more general case, moreover, whenever the "forced" wave $(\vec{k}_1 + \vec{k}_2)$ in the body is oblique with respect to $\vec{Q}$, then the output wave $\vec{k}_3$ of maximum intensity is also oblique with respect to both $(\vec{k}_1 + \vec{k}_2)$ and $\vec{Q}$, in accordance with Eq. (4) above.

In many device applications, the reflected output wave $\vec{k}_3$ will have the advantage of a relatively larger angular separation from $(\vec{k}_1 + \vec{k}_2)$ as well as from the incident waves $\vec{k}_1$ and $\vec{k}_2$ themselves than in the case of the transmitted output wave; so that in these applications, it is the use of the reflected output wave which is more advantageous.

In the special case of second harmonic generation from an input consisting of a single beam, it should be understood that $\vec{k}_1 = \vec{k}_2$ in Eq. (4) above, as well as in all consideration involving $(\vec{k}_1 + \vec{k}_2)$. For a particular example of a device constructed in accordance with some of the principle of this invention, see the article by one of us in Physical Review Letters 21, No. 19, pages 1,404–1,406 (4 Nov. 1968).

In a specific embodiment of this invention, an input of radiation comprising two input beams of frequencies $f_1$ and $f_2$ respectively, are incident upon a stack of optically nonlinear sheets. All of the sheets in the stack have the same width and are made of the same nonlinear material, but each of the sheets has a nonlinear optical tensor coefficient of opposite sign from its next neighbor. Thus, the algebraic sign of this tensor coefficient alternates from sheet to sheet along the stack. For example, each of the sheets is essentially a noncentrosymmetric crystal having its axis of symmetry diametrically in the opposite direction from that of its next neighbor. In this embodiment of alternating algebraic sign of a tensor coefficient, the largest spatial Fourier component, in the Fourier analysis of the tensor coefficient along the stack, corresponds to a spatial period $2Q$ equal to twice the thickness of each sheet in the stack. Thus, for the stack of sheet each of which has a width $w$, $2w$ will be equal to $2q$ and hence:

$$|\vec{Q}| = 2\pi/2w, \quad (5)$$

with $\vec{Q}$ directed normal to the parallel interfaces between the sheets, and where $\vec{Q}$ corresponds to the spatial "fundamental." This follows from the well-known Fourier decomposition of a square-wave type of periodicity, which is the type of periodicity in the tensor coefficient presented by the stack of sheets wherein the algebraic sign of the tensor coefficient alternates along the stack from sheet to sheet. On the other hand, "odd harmonic" components also are present in the spatial Fourier analysis of a square wave, as is also well known. Thus, a spectrum $\vec{Q}_n$ of odd (spatial) "harmonics" of $\vec{Q}$ are also present in the Fourier analysis of the tensor coefficient of the stack of sheets, where $\vec{Q}_n$ satisfies:

$$\vec{Q}_n = (2n+1)\vec{Q}. \quad (6)$$

In Eq. (6), it should be understood that $n$ is a positive integer. For each $\vec{Q}_n$ satisfying Eq. (6), upon multiple nonlinear generation and reflections in the stack of sheets, appreciable intensity will be produced for the output reflected or transmitted wave(s) of frequency $f_3 = f_1 + f_2$ having propagation constant(s) $\vec{k}_3$ satisfying:

$$\vec{k}_3 = \vec{k}_1 + \vec{k}_2 + \vec{Q}_n, \quad (7)$$

where again $\vec{k}_1$ and $\vec{k}_2$ are the propagation constants in the stack of sheets of the waves of frequency $f_1$ and $f_2$. Eq. (7) is merely a restatement of Eq. (4) above for each of the significant Fourier components, corresponding to $\vec{Q}_n$, in the Fourier analysis of the square wave nonlinear tensor coefficient presented by the stack of sheets of alternating sign.

In the case of the reflected wave, each sheet in the stack has a sufficiently small width $w$ such that the magnitude of $\vec{Q}_n$ is advantageously at least as large as the same order of magnitude as $\vec{k}_1 + \vec{k}_2$, in order that the direction of the output $\vec{k}_{3,n}$ be substantially different from the direction of $(\vec{k}_1 + \vec{k}_2)$, as desired in many applications of this invention. In turn, this means, at least in the preferred cases of small $n$, that the width $w$ of the sheets be at least as small as, and preferably smaller than the wavelength of the wave $(\vec{k}_1 + \vec{k}_2)$ in the sheet. The reason why it is preferred to rely upon $\vec{Q}_n$ corresponding to small $n$ is that the coefficients of any Fourier analysis tend to become relatively small for large $n$, as may be understood from convergence requirements; and hence, relatively very little reflection intensity is furnished by those $\vec{Q}_n$ corresponding to relatively large $n$, i.e., greater than about 10.

In any event, the width $w$ of the sheets is selected to make the value of $|\vec{Q}|$ according to Eq. (5) above such that $\vec{k}_3$ is in the desired direction according to Eq. (7) above.

Thus far, the discussion of this invention has been summarized for definiteness in terms of optical electromagnetic wave energy. However, this invention can have embodiments involving other regions of the electromagnetic spectrum, such as X rays. In the case of X rays, however, a spatially periodic nonlinear structure is required with a much smaller value of $2q$ than in the optical case, where $2q$ is the spatial periodicity in a nonlinear electromagnetic tensor interaction coefficient (such as the nonlinear dielectric interaction). Advantageously, this nonlinear structure is furnished by the inherent spatial periodicity due to the crystal structure itself in a centrosymmetric or noncentrosymmetric crystal, preferably single crystal. This spatial periodicity $2q$ then naturally results from the periodicity in the lattice structure itself and is of the order of the lattice constant. Corresponding to $2q$, the vector $\vec{Q}$ is defined as in Eq. (3) above. $\vec{Q}$ is now directed perpendicular to any of the Bragg planes in the crystal; while $\vec{Q}$ makes an obtuse angle with $\vec{k}_1 + \vec{k}_2$ for a reflected wave $\vec{k}_3$, and an acute angle therewith for a transmitted wave $\vec{k}_3$. Appreciable output intensity occurs for waves $\vec{k}_3$ satisfying Eq. (4) above. It should be understood that a given lattice structure in general presents nonvanishing Fourier coefficients corresponding to higher spatial "harmonics" $\vec{Q}_m$ satisfying:

$$\vec{Q}_m = m \vec{Q}, \tag{8}$$

where $m$ is a positive integer. Appreciable intensity in output waves $\vec{k}_{3,m}$ occurs for those output waves satisfying $$\vec{k}_{3,m} + \vec{k}_1 + \vec{k}_2 + \vec{Q}_m. \tag{9}$$

Although the above discussion has been limited to an output of frequency $f_3 = f_1 + f_2$, the output can also be a wave of frequency $(f_1 - f_2)$. Moreover, it is obvious that in parametric processes, such as down-conversion, the input is a wave of frequency $f_3$ and the output is composed of waves having frequencies $f_1$ and $f_2$ satisfying $f_3 = f_1 + f_2$. Thus, in general, this invention can be used for parametric processes with a plurality of input and output waves obeying:

$$\Sigma f_f = \Sigma f_i \tag{10}$$

$$\Sigma \vec{k}_f = \Sigma \vec{k}_i + \vec{Q}_m \tag{11}$$

where $f_f$ and $\vec{k}_f$ are the frequencies and wave propagation vectors of the final output waves, while $f_i$ and $\vec{k}_i$ are the frequencies and propagation vectors of the input waves. In Eqs. (10) and (11), it should be understood that the summation sign, $\Sigma$, includes differences as well as sums. Moreover, the $m$ appearing in Eq. (10) and Eq. (11) can now be a positive as well as a negative integer in this general case, but preferably the magnitude of $m$ is selected to be less than about 10 in order for there to exist an appreciable Fourier coefficient of nonlinear interaction corresponding to this $\vec{Q}_m$.

In a particular parametric device embodiment of this invention, for example an X-ray frequency down-converter of $f_p$ into $f_s$ and $f_i$ utilizes the type of crystal just described. Down-conversion of X rays is useful not only for X-ray sources of arbitrary frequency, but also for determining the electron density in chemical bonds in the crystal (by taking 3-dimensional Fourier transforms of the output at different angles of orientation of the crystal relative to the input). The pump wave $\vec{k}_p$ is incident upon the crystal, and the down-converted output waves $\vec{k}_1$ and $\vec{k}_2$ of frequencies $f_1$ and $f_2$ satisfy:

$$f_1 + f_2 = f_p \tag{12}$$

$$\vec{k}_1 + \vec{k}_2 = \vec{k}_p + \vec{Q}_m. \tag{13}$$

Rotation of the crystal relative to the input pump X-ray beam of frequency $f_p$, for example, affords the ability of satisfying Eq. (12) and Eq. (13) simultaneously, as required for successful parametric operation.

Moreover, in view of the usual mosaic character of single crystals, either $\vec{k}_1$ or $\vec{k}_2$ advantageously is collinear with $\vec{Q}_m$, in order to maximize the efficiency of the down-conversion process.

Returning to the more general case governed by Eqs. (10) and (11) above, it should be remembered that the magnitude of each $\vec{k}_i$ and $\vec{k}_f$ appearing in Eq. (11) is determined by the refractive indices, once the input and output frequencies $f_i$ and $f_f$ are all specified. Thus, in accordance with this invention, for given input and output frequencies satisfying Eq. (10), but otherwise arbitrary, and for arbitrary propagation directions in the nonlinear spatially periodic structure, the magnitudes and directions of all the input and output propagation vectors $\vec{k}_i$ and $\vec{k}_f$ are thereby determined. Thus, Eq. (11) can then be satisfied by selecting $\vec{Q}_m$ to form a closed vector diagram (closed polygon) together with all these $\vec{k}_i$ and $\vec{k}_f$. In turn, for an arbitrarily given (but preferably small) integer $m$, $\vec{Q}$ itself is determined by Eq. (8) above; and hence, the orientation of the spatial periodic nonlinear structure is thereby determined (that is, parallel to $\vec{Q}$), while the required spatial periodicity $2q$ of this structure is determined by Eq. (3) above. Similar considerations apply to the optically nonlinear parallel sheets of alternating sign, except that the subscript $m$ appearing in Eq. (11) is then replaced by the subscript $n$ and the vector $\vec{Q}$ is determined by Eq. (6) above. In turn, the width $w$ of the sheets is then determined by Eq. (5) above, and the orientation of the sheets is simply such that the normal to the interface between successive sheets is parallel to $\vec{Q}_n$. Thus, this invention can be used in conjunction with an arbitrary predetermined set of propagation vectors in the nonlinear structure.

BRIEF DESCRIPTION OF THE DRAWING

This invention, together with its features, advantages and objectives may be better understood from a reading of the following detailed description in conjunction with the drawing in which.

DETAILED DESCRIPTION

Figure 1:
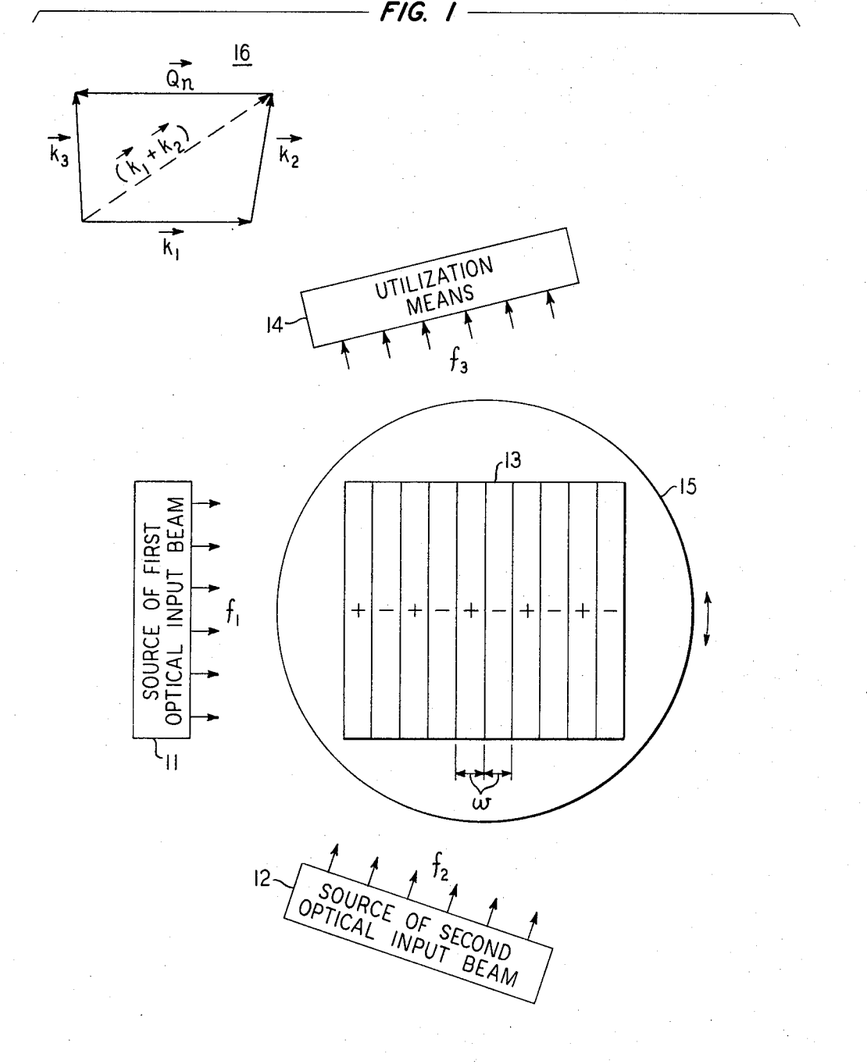
FIG. 1 shows a system for optical mixing in accordance with a specific embodiment of this invention.

As shown in FIG. 1, a source 11 of a first input optical beam of frequency $f_1$ and a source 12 of another second optical input beam of frequency $f_2$ are arranged such that the respective input beams $f_1$ and $f_2$ are incident upon the body 13 to be described more fully below. The output beam of frequency $f_3 = f_1 + f_2$ is then incident upon utilization means 4 for use of the beam $f_3$.

The body 13 consists of a stack of mutually parallel sheets of equal width $w$. Each of said sheets is made of the same optically nonlinear noncentrosymmetric material; such as quartz. By reason of the choice of adjacent sheets in the body 13 to be inversion images of each other in respect of crystal symmetry, the algebraic sign of an optical nonlinear dielectric tensor coefficient of interaction of the waves $\vec{k}_1$ and $\vec{k}_2$ with the body 13 alternates from sheet to sheet. The alternation in algebraic sign is indicated by the $+$ and $-$ signs in FIG. 1. Thus, this optical nonlinear dielectric tensor coefficient in each of said sheets is of opposite algebraic sign with respect to its next neighbor in the body 13. Due to the optical nonlinearity, the two beams from the source 1 and the source 2 are mixed within the body 13 to form a sum frequency beam having a frequency $f_3 = f_1 + f_2$. Upon nonlinear reflections by the interfaces of the various sheets in the stacks, an output beam of sum frequency $f_3 = f_1 + f_2$ and propagation constant $\vec{k}_3$ will be formed. This output beam $f_3$ will have an appreciable intensity, provided it satisfies the corresponding relation given by Eq. (7) above, to wit:

$$\vec{k}_3 = \vec{k}_1 + \vec{k}_2 + \vec{Q}_n \quad (14)$$

where $\vec{Q}_n$ is defined as in Eq. (6) above.

A vector diagram corresponding to Eq. (14) is illustrated in the closed vector diagram 16 of FIG. 1, and constitutes a representation of the nonlinear analogue of Bragg's condition for reflection in the body 13. In this vector diagram 16, the vectors $\vec{k}_1$ and $\vec{k}_2$ are parallel to the directions of propagation of waves $f_1$ and $f_2$ respectively in the body 13. Moreover, the magnitude of these vectors $\vec{k}_1$ and $\vec{k}_2$ is determined by the wavelength of waves $f_1$ and $f_2$ in the body 13. The direction of these vectors, on the other hand, is determined by the directions of propagation of the wave in the body 13. The magnitude of the vector $\vec{Q}_n$ is determined by the width of the sheets (Eqs. (5) and (6) above); while the direction of $\vec{Q}_n$ is perpendicular to the interfaces between the sheets in the body 13. The output beam of frequency $f_3 = f_1 + f_2$ is produced in the body 13 and exits therefrom with a propagation vector corresponding to $\vec{k}_3$ in the body 13. Utilization means 14 collect the wave energy in the output beam $f_3$ exiting from the body 13.

The body 13 is mounted on the rotatable turntable 15, so that the Bragg conditions can be satisfied simultaneously for frequency as well as for propagation vectors.

It should be understood that $\vec{k}_1$ and $\vec{k}_2$, as well as $\vec{k}_{out}$ are propagation constants of the respective beams inside a medium of the bulk material of which the body 13 is made. Moreover, rotation of the body 13 in the plane of the drawing FIG. 1 will rotate and thereby change the direction of the vector $\vec{Q}_n$ for every $n$. Thus, the body 13 can be oriented to satisfy Eq. (7) above at different angles of rotation of this body with respect to the beams $f_1$ and $f_2$ for a fixed integer $n$ corresponding to the vector $\vec{Q}_n$. It should be understood that for a given integer $n$ in a given body 13, and for given sources 11 and 12, appreciable intensity in the output sum frequency beam $f_3$ does not occur in general at a given angle of rotation of the body 13. Thus, rotating the body 13 affords a means of obtaining an appreciable output intensity at frequency $f_3 = f_1 + f_2$; that is, a solution of Eq. (14) is afforded for the output beam $f_3$. Moreover, selecting a different width $w$ for the sheets in the body 13 affords another means for obtaining a solution of Eq. (14), and hence, appreciable output intensity in the beam $f_3$. It should be remarked that the closed vector diagram 16 shows the vector $\vec{Q}_n$ making an obtuse angle with the vector $(\vec{k}_1 + \vec{k}_2)$. Thus, the output $f_3$ is obtained by the process of reflection. Reversal of $\vec{Q}_n$ would produce an output which is obtained by the process of transmission, provided Eq. (14) above is satisfied for this direction of $\vec{Q}_n$.

The spatially periodically alternating sign of a tensor coefficient of electromagnetic interaction in the body 13 can also be achieved by subjecting and maintaining a single noncentrosymmetric crystal (such as ammonium chloride) at a temperature below its $\lambda$-point transition (approximately 242.5° K). Thereby the single crystal breaks up into domains of approximately equal width and alternating sign, as desired. The U. S. Pat. No. 3,407,309 to R. C. Miller, issued on Oct. 22, 1968 describes a similar structure in ferroelectric crystals.

Figure 2:
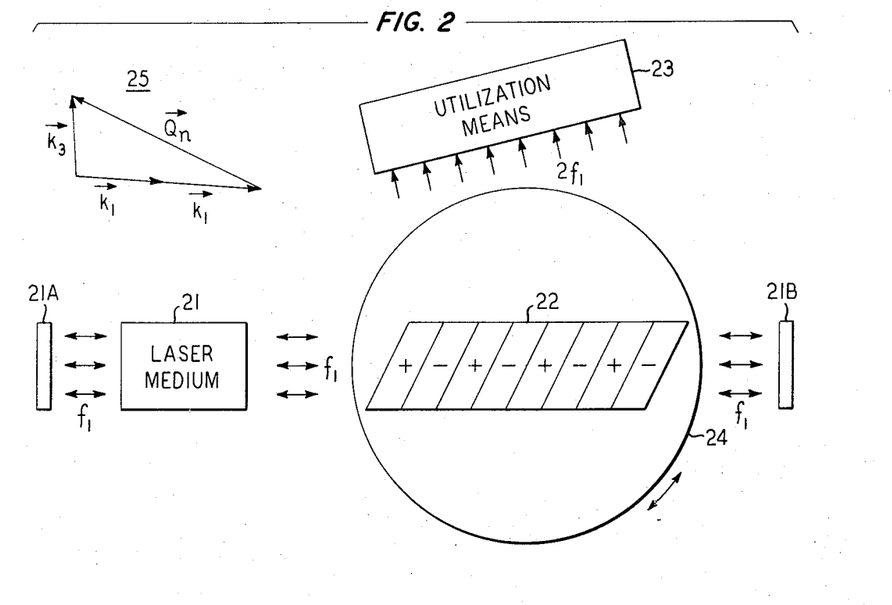
FIG. 2 shows a system for second harmonic generation in accordance with still another specific embodiment of this invention.

The advantages of this invention as a second harmonic generator can be understood with reference to FIG. 2. The laser medium 21, in conjunction with a pump (not shown) and the reflecting mirrors 21A and 21B produces a laser wave oscillation of fundamental frequency $f_1$, serving as the input for the body 22. The body 22 is made of spatially periodic optically nonlinear material, advantageously in the form of a stack of mutually parallel sheets of equal width but having alternating sign of a tensor coefficient of nonlinear interaction. Thus, the body 22 is similar to the body 13 shown in FIG. 1, but in general these bodies have different dimensions in order to furnish a different value of $|Q_n|$ as needed to satisfy the nonlinear Bragg's law. The body 22 is oriented with respect to the input wave beam $f_1$ such that second harmonic wave $2f_1$, which is generated from the fundamental $f_1$ within this body 22, is reflected out of this body at an oblique angle with respect to the input, all in accordance with the nonlinear analogue of Bragg's law.

The orientation of the body 22 with respect to the laser beam $f_1$ can be adjusted by means of the rotatable turntable 24 on which the body 22 is mounted. Thereby the second harmonic generation process can be turned to maximum efficiency, in accordance with the nonlinear Bragg's law illustrated by the closed vector diagram 25. The vector $\vec{k}_1$ in this diagram 25 is parallel to the propagation direction of the wave $f_1$ in the body 22, while the vector $\vec{Q}_n$ (determined by Eq. (6) above) is normal to the interfaces between the sheets in the body 22. The output second harmonic beam of frequency $2f_1$ is produced in the body 22 and exits therefrom with a propagation vector corresponding to $\vec{k}_3$ in the body 22. Utilization means 23 collect the wave energy in the second harmonic wave $2f_1$ for use thereof. Thus, the second harmonic wave $2f_1$ generated in the body 22 never traverses the laser medium 21, which generally is lossy for the second harmonic. Thus, the efficiency of second harmonic wave generation is not deteriorated by any traverse in the laser medium 21.

Figure 3:
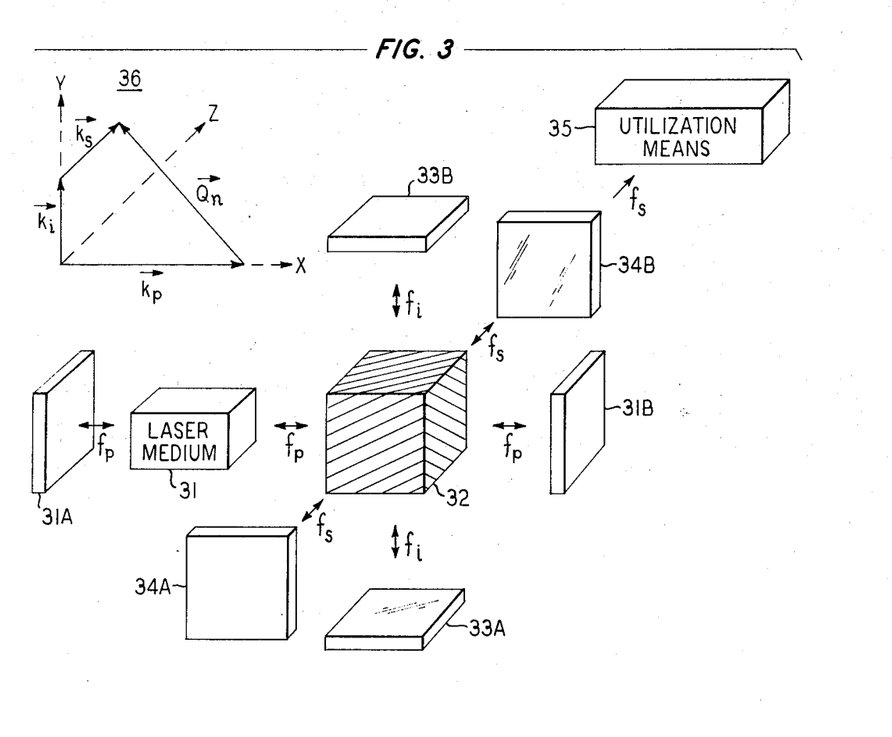
FIG. 3 shows a system for parametric oscillation in accordance with yet another embodiment of this invention.

FIG. 3 shows a system for parametric oscillation of waves in the optical region of the electromagnetic spectrum, according to another aspect of this invention. As described more fully below, however, this system can easily be modified for parametric amplification. The laser medium 31, in conjunction with a pump (not shown) and the reflecting mirrors 31A and 31B produces a laser wave oscillation of frequency $f_1$, serving as the input parametric pump wave to the body 32. The body 32 is made of spatially periodic optically nonlinear material, advantageously in the form of a stack of mutually parallel sheets of equal width but having alternating sign of a tensor coefficient of nonlinear interaction, similar to the body 22 previously described in connection with FIG. 2. Signal and idler waves of frequencies $f_s$ and $f_i$ will be generated in the body 32 when it is oriented with respect to the input pump wave $f_p$ such that the nonlinear Bragg's law is satisfied, as illustrated in the closed vector diagram 36. Reflecting mirrors 33A and 33B resonate the idler wave $f_i$, while reflecting mirrors 34A and 34B resonate the signal wave $f_s$, as known in the art. For example, mirrors 33A, 34A, and 33B are as nearly perfectly reflecting as possible, while mirror 34B is partially reflecting. Utilization means 35 collect the wave energy in the signal wave $f_s$. Thus, the body 32 serves as a medium for producing parametric oscillation when pumped by the wave $f_p$. It should be understood that the mirrors 33A or 33B can be made partially reflecting in conjunction with utilization means (not shown) in the resulting path of exiting wave energy $f_i$ from the mirror 33A or 33B.

The orientation of the body 32 with respect to the pump input beam $f_p$ advantageously can be adjusted by means of the gimbal rings (not shown) upon which the body 32 is mounted. Thereby, maximum efficiency of parametric oscillation can be obtained, in accordance with the nonlinear Bragg's law illustrated by the closed vector diagram 36. It should be understood that the wave propagation vectors $\vec{k}_p, \vec{k}_i,$ and $\vec{k}_s$ correspond to pump idler and signal waves, respectively, in the body 32. It should be understood that in general these wave vectors need not be coplanar, and thus, also the mirrors 33A, 33B, 34A, 34B then will be arranged to support the signal and idler waves in different planes. Thus, in any case, the parametric oscillation of the wave $f_s$ is built up by means of the amplification of internal noise in the body 32 of frequency $f_s$ in the presence of the pump $f_p$.

It should be understood that by feeding into the body 32 some signal wave energy of frequency $f_s$, the apparatus shown in FIG. 3 can be used as a parametric amplifier.

Figure 4:
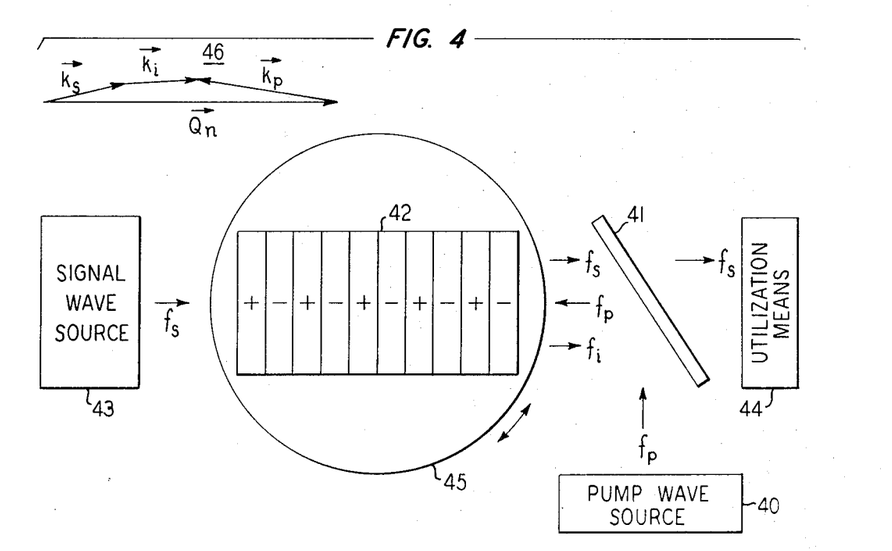
FIG. 4 shows a system for backward wave parametric amplification in accordance with still another embodiment of this invention.

FIG. 4 shows a backward wave type of parametric amplifier in accordance with yet another aspect of this invention. A source 40 of the pump wave of frequency $f_p$ is fed into the body 42 by means of the "45°" oriented mirror 41 which reflects this pump wave into this body. The body 42 is made of nonlinear optical material in the form of a stack of sheets having alternating sign of a nonlinear tensor coefficient of electromagnetic interaction in response to the pump wave $f_p$. The vector $\vec{Q}_n$ is associated with this body 42 in accordance with Eq. (6) above. The source 43 of the signal wave of frequency $f_s$ is incident upon the body 42 on the opposite side from that of the pump wave $f_p$. The idler wave of frequency $f_i$ will be generated in the body 42 and the signal wave $f_s$ will be amplified in the body 42 with maximum efficiency provided the nonlinear Bragg's law is satisfied, as illustrated by the closed vector diagram 46. The utilization means 44 collects signal and/or idler wave energy exiting from the body 42 after transmission through the approximately "45°" mirror 41. Tuning for maximum parametric efficiency can be obtained by mounting the body 42 on the rotatable turntable 45 and rotating same in conjunction with adjusting both the direction of the wave $f_s$ emanating from the signal source 43 and the direction of the pump wave $f_p$ from the pump wave source 40 (and/or the orientation of the mirror 41). Of course, the system shown in FIG. 4 can be operated as a backward wave parametric oscillator with the omission of the signal wave source 43. It should be understood that the wave propagation vector in the diagram 46 need not be coplanar, so that the various aforementioned adjustments of relative orientation can be accordingly more flexible to yield the correspondingly noncoplanar wave propagation vectors. Moreover, it should be obvious that both the output signal wave $\vec{k}_s$ is obtained from the idler and pump wave $\vec{k}_i$ and $\vec{k}_s$ by means of a process of nonlinear reflections. This is true since $\vec{k}_s$ is (at least approximately) in the opposite direction from $(\vec{k}_p + \vec{k}_i)$, and since $(\vec{k}_i + \vec{k}_s)$ is (at least approximately) in the opposite direction from $\vec{k}_p$. Likewise, it should be understood that the threshold of operation can be improved by the addition of an idler wave source to furnish an idler wave input into the crystal 42, in addition to the signal wave input.

Figure 5:
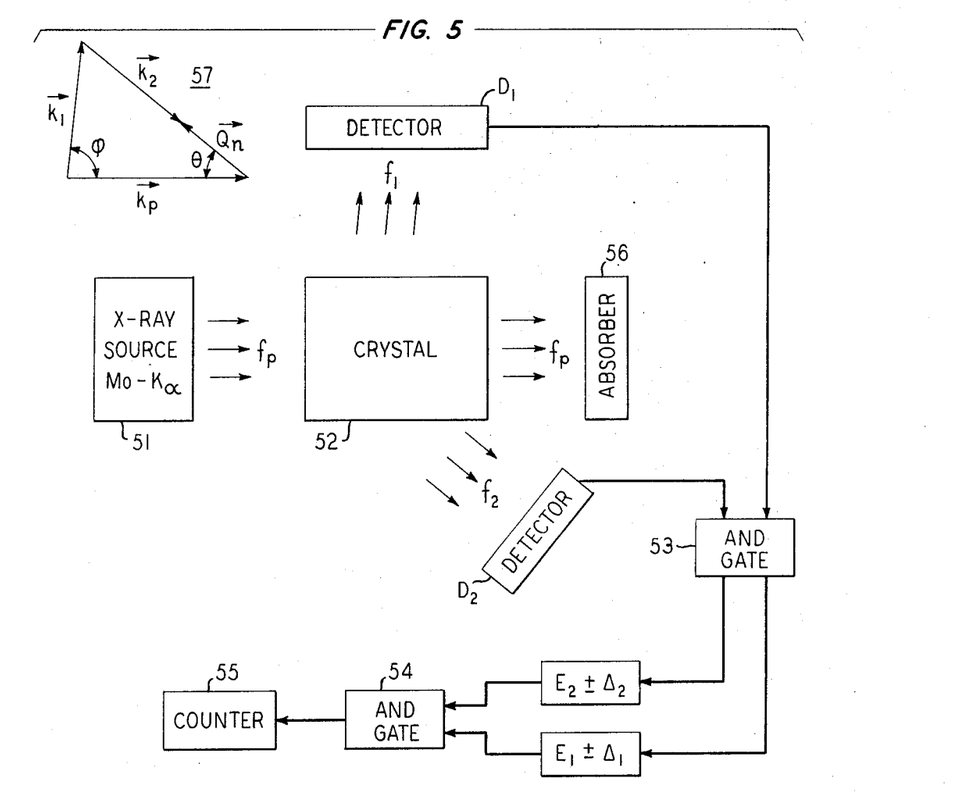
FIG. 5 shows a system for X-ray down-conversion in accordance with another specific embodiment of this invention.

FIG. 5 shows an arrangement for the purpose of parametric "down-conversion," i.e., conversion of a higher frequency input, in the X-ray region of the electromagnetic spectrum, into a lower frequency output. The X-ray source 51 provides an input "pump" wave of frequency $f_p$ which is incident upon a nonlinear crystal 52 which has a nonlinear electromagnetic tensor interaction of the X-ray region of the electromagnetic spectrum with the crystal material. In general, such a nonlinear crystal can be either a noncentrosymmetric or a centrosymmetric crystal which exhibits this nonlinear tensor interaction; since either of these crystal structures gives rise to sets of Bragg planes. However, for reasonably high output in the centrosymmetric case, advantageously, the crystal is selected such that there are an appreciable fraction of atoms which are not located on centers of symmetry. A selected set of the Bragg planes in any event has a spatial periodicity equal to, say, $2q$. Advantageously, for appreciable amplitude in the output waves $f_1$ and $f_2$, the Bragg plane to be utilized should be characterized by there being a nonvanishing "D.C." component of spatial periodicity in the interaction tensor along every direction in this plane. Typically, an absorbing element 16 is located behind the crystal 12 in order to prevent the transmitted input wave $f_p$ from obscuring the outputs into the utilization means.

In order to discriminate against background noise, the utilization means shown in FIG. 5, advantageously is somewhat complicated. Detectors $D_1$ and $D_2$ of the output waves $f_1$ and $f_2$ convert these respective output waves into electrical voltage signals, each of which has a predetermined voltage amplitude depending only upon the frequencies $f_1$ and $f_2$. Such detectors are well known in the art. These electrical voltage signals are fed through the AND gate 53 which allows them to pass therethrough if and only if they arrive at the gate 53 simultaneously. After passing through this gate 53, the voltage signals (of predetermined value) are fed to the discriminators $E_1 \pm \Delta_1$ and $E_2 \pm \Delta_2$ which allows these voltage signals to pass if and only if they lie within the prescribed ranges $\Delta_1$ and $\Delta_2$ centered at the predetermined voltages, say, $E_1$ and $E_2$. Then these voltage signals are fed into another AND gate 54 which yields an output to the counter 55 if and only if the signals from the discriminators arrive at this gate 54 simultaneously. Thus, it is important to arrange the geometry of FIG. 5 (including delay lines if desired) such that whenever the pump wave $f_p$ is down-converted, the waves $f_1$ and $f_2$ arrive at the detectors $D_1$ and $D_2$ such that the outputs of these detectors arrive at the gate 53 simultaneously.

As a specific example, the source 51 is a 25 k.w. (input) molybdenum source of $K_\alpha$ radiation (Mo-$K_\alpha$), i.e., of about 0.7 A vacuum wavelength. Advantageously, a zirconium filter (not shown) is placed between this source and the nonlinear crystal 52 in order to reduce noise. Moreover, the crystal 52 is diamond which, for reasons to be discussed below, is oriented such that the propagation direction of $\vec{k}_2$ is collinear with respect to the relevant $\vec{Q}_m$. In this example, moreover, $\vec{Q}_m$ is collinear with respect to the perpendicular to the plane <0, 0, 4> in this crystal 52. Between the crystal 52 and the detectors $D_1$ and $D_2$ are placed copper filters in combination with aluminum reflecting crystal filters (not shown) which are oriented such that they allow passage only of the output waves of frequencies $f_1$ and $f_2$ as the case may be. Such aluminum crystals are well known in the art of conventional linear Bragg reflection.

As readily obtainable in the present state of the art, nonlinear single crystals such as diamonds have a mosaic crystal structure. Therefore, the effective coherence length (i.e., the distance over which the desired phase relationships are maintained) is not equal to the full length L of the crystal even when Eq. (13) above is satisfied. Due to this mosaic structure, the coherence length, and hence the effective length over which the desired parametric process occurs, is limited to the order of $(\lambda/\epsilon)$, where $\lambda$ is the wavelength of the radiation and $\epsilon$ is the angular spread of the mosaic "slip." In the X-ray region, $(\lambda/\epsilon)$ typically is at least an order of magnitude smaller than the length L of the crystal 12, and therefore the efficiency of X-ray down-conversion is correspondingly reduced due to the mosaic structure. However, if $\vec{Q}_m$, the normal to the significant Bragg crystal planes responsible for the down-conversion, is collinear with respect to the propagation direction of the idler, i.e., either $\vec{k}_1$ or $\vec{k}_2$ in the crystal, then the coherence length becomes of the order of $\lambda/\epsilon^2$; that is, the coherence length then become quadratic in the reciprocal of the mosaic "slip" $\epsilon$. Thus, the case of either $\vec{k}_1$ or $\vec{k}_2$ being collinear with respect to $\vec{Q}_m$ yields a significant improvement in coherence length over the other wise linear relationship $(\lambda/\epsilon)$ previously mentioned. The vector diagram 57 at the left-hand side of FIG. 5 shows a vectorial representation such a case, in which, for definiteness, it is $\vec{k}_2$ which is chosen to be the idler which is collinear with $\vec{Q}_m$. There is, however, only a narrow cone of signal propagation directions in this case for which this desirable quadratic dependence holds. In the special case near degeneracy, i.e., the difference between $f_1$ and $f_2$ being small compared with either $f_1$ or $f_2$, this narrow cone is approximately determined by the relation:

$$LQ_m\left(1+\frac{Q_m}{k_2}\right)\left(\epsilon^2/2+\frac{k_1\epsilon\delta\varphi}{2Q_m}\right)\cos\theta < \pi \quad (15)$$

where $\delta\phi$ is the apex angle of the cone, and $\theta$ is the angle between $-\vec{k}_p$ and $\vec{Q}_m$.

In order to take advantage of the improvement arising from the aforementioned quadratic relationship ($\lambda/\epsilon^2$), therefore, the crystal 52 is oriented such that the idler $\vec{k}_2$ is collinear with $\vec{Q}_m$, as indicated by the vector diagram 57. For a given pump frequency and propagation direction, $\vec{k}_p$ is determined, so that the desired orientation of the crystal 52 with respect thereto is determined in accordance with the well-known law of triangles:

$$\cos\theta = [k_p^2 + (k_2+Q_m)^2 - k_1^2] / 2k_p(k_2+Q_m). \quad (16)$$

For the example with the Mo-$K_\alpha$ source 51, and in the case of $\vec{Q}_m$ perpendicular to the <0, 0, 4> plane with $m = 1$, $Q_m$ is about 3.5 (A)$^{-1}$. Thus, for the particular case $f_1 = f_2 = f_p/2$, from Eq. (16), it is found that $\theta$ is about 64°.

It should be understood that as more powerful X-ray sources become available, instead of the arrangement of detector $D_1$ and $D_2$ connected with AND gates 53 and 54 through the discriminators $E_1 \pm D_1$ and $E_2 \pm D_2$ to the counter 55, the utilization means can be selected as much simpler X-ray detectors. Moreover, the zirconium, copper, and aluminum filters mentioned above can then be omitted. Moreover, in such cases, the efficiency of parametric processes can be improved by means of well-known X-ray resonators such as those formed by an array of linear Bragg's law crystals to provide feedback (reflections) of the signal and/or idler and/or pump; thereby the threshold of parametric oscillation can be exceeded.

Although FIG. 5 shows the crystal 52 arranged for outputs $f_1$ and $f_2$ obtained by means of nonlinear transmission through this crystal, it should now be obvious that it may also be arranged for outputs which are obtained by internal nonlinear reflection. Moreover, by adjusting the orientation of the crystal 52, it is obvious that for a given input $f_p$ there can be appreciable outputs $f_1$ and $f_2$ which are characterized by $f_1$ being much smaller than $f_2$. For example, the input $f_p$ and the output $f_1$ can be in the X-ray region while the output $f_2$ will be in the optical region.

It should now be obvious that frequency regions of the electromagnetic spectrum other than the X-ray or optical region can be used in this invention, provided the crystal 13 is also nonlinear in these other regions.

It should now be obvious how to apply this invention in all its aspects and embodiments to all types of parametric processes including such devices used as oscillators, amplifiers, down-converters, and up-converters. In the X-ray region, this is especially important as more powerful sources become available. Also, down-conversion continuously from the X-ray region down to the far ultraviolet is feasible with such sources. In such cases, advantageously, the nonlinear crystal is oriented such that the conventional linear Bragg law is almost, but not exactly, satisfied for the pump itself; thereby the nonlinear analogue of Bragg's law can be satisfied for the down-conversion of X-ray input into the ultraviolet or other regions of the spectrum.

It should be understood that in all events the plane of polarization of the input wave, or waves, as the case may be, should be selected such that the nonlinear tensor coefficient couples this wave in the nonlinear material with the desired plane of polarization of the output wave.

What is claimed is:

1. In a generator of an output of electromagnetic radiation having a frequency different from a frequency in an input of electromagnetic X-ray radiation, a body of nonlinear material located in the path of the input of radiation, a nonlinear tensor coefficient of interaction of the input of radiation with the body having a significant spatial Fourier component corresponding to a spatial periodicity in a first direction in the body such that the output is generated in the body in accordance with:

$$\Sigma \vec{k}_f = \Sigma \vec{k}_i + \vec{Q}_m,$$

and with:

$$\Sigma f_f = \Sigma f_i,$$

where $\vec{k}_f$ is(are) the propagation constant(s) of the output in the body, $f_f$ is(are) the corresponding frequencies, $\vec{k}_i$ is(are) the propagation constant(s), equal or unequal, of the input in the body, $f_i$ is(are) the corresponding frequencies, and $\vec{Q}_m$ is a vector in the direction of the normal to a set of Bragg planes in the body corresponding to a significant Fourier component of spatial periodicity of optical reactive nonlinearity of the body, the magnitude of $\vec{Q}_m$ being equal to an integral multiple of the reciprocal of the spatial periodicity, the first direction in the body having an orientation with respect to the input such that the output beam has a wave propagation vector in the body which is in either a different or an opposite direction from the vector sum of any input wave propagation vectors in the body.

2. A generator of an output beam of radiation having a frequency different from any frequency in an input of radiation which comprises:
   a. means for providing the input of radiation; and
   b. a body according to claim 1 located in the path of the input.

3. A parametric down-converter of an input wave in the X-ray region of the spectrum which comprises:
   a. a source of the input wave in the X-ray region;
   (b) an X-ray nonlinear crystal located in the path of the input wave and oriented such that $\vec{k}_p + \vec{Q}_m = \vec{k}_1 + \vec{k}_2$, and with $f_p = f_1 + f_2$, where $\vec{k}_p$ is the propagation vector in the crystal of the input wave, $f_p$ is the corresponding frequency, $\vec{k}_1$ and $\vec{k}_2$ are the propagation vectors in the crystal of the output waves, $f_1$ and $f_2$ are the corresponding frequencies, and $\vec{Q}_m$ is a vector in the direction of the normal to a set of Bragg planes in the crystal corresponding to a significant Fourier component of spatial periodicity of optical reactive nonlinearity of the crystal, the magnitude of $\vec{Q}_m$ being equal to an integral multiple of the reciprocal of the spatial periodicity; and
   c. means for detecting the output wave of frequency lower than the input wave.

4. The device recited in claim 3 in which the nonlinear crystal is oriented with respect to the input wave such that an idler wave generated in the crystal is collinear with respect to the normal to the significant Bragg crystal planes.

5. The device recited in claim 3 in which the wavelength of the input wave is about 0.7 Angstrom.

* * * * *